United States Patent
Ginsberg et al.

(10) Patent No.: US 7,707,096 B2
(45) Date of Patent: Apr. 27, 2010

(54) FUTURES CONTRACT ON OPTIONS CONTRACTS EXCHANGE DEVICE

(75) Inventors: Philip Ginsberg, Eastville, VA (US); Timothy H. Heaton, Morristown, NJ (US)

(73) Assignee: BGC Partners, Inc., New York, NY (US)

( * ) Notice: Subject to any disclaimer, the term of this patent is extended or adjusted under 35 U.S.C. 154(b) by 2033 days.

(21) Appl. No.: 10/329,809

(22) Filed: Dec. 24, 2002

(65) Prior Publication Data

US 2003/0125982 A1 Jul. 3, 2003

Related U.S. Application Data

(60) Provisional application No. 60/344,258, filed on Dec. 27, 2001.

(51) Int. Cl.
*G06Q 40/00* (2006.01)
(52) U.S. Cl. .................... 705/37; 705/35; 705/36 R
(58) Field of Classification Search .............. 705/35–37
See application file for complete search history.

(56) References Cited

U.S. PATENT DOCUMENTS

| | | | |
|---|---|---|---|
| 5,873,071 A * | 2/1999 | Ferstenberg et al. | 705/36 R |
| 5,963,923 A | 10/1999 | Garber | 705/37 |
| 6,269,346 B1 * | 7/2001 | Cristofich et al. | 705/36 R |
| 6,304,858 B1 | 10/2001 | Mosler et al. | 705/37 |
| 6,618,707 B1 * | 9/2003 | Gary | 705/36 R |
| 6,766,303 B2 * | 7/2004 | Marshall | 705/36 R |
| 7,337,141 B2 * | 2/2008 | Sullivan et al. | 705/37 |
| 2002/0026405 A1 | 2/2002 | Haar | |
| 2002/0035531 A1 * | 3/2002 | Push | 705/36 |
| 2002/0103744 A1 * | 8/2002 | Llewelyn | 705/37 |
| 2002/0194136 A1 * | 12/2002 | Sullivan et al. | 705/64 |
| 2003/0009415 A1 * | 1/2003 | Lutnick et al. | 705/37 |
| 2003/0028476 A1 * | 2/2003 | Jenkins et al. | 705/37 |
| 2004/0172349 A1 * | 9/2004 | Quinn et al. | 705/35 |

OTHER PUBLICATIONS

Heath, Chip., Steven Huddart, Mark Lang, Psychological Factors and Stock Option Exercise, The Quarterly Journal of Economics, vol. 114, No. 2, May 1999, pp. 601-627.*

* cited by examiner

*Primary Examiner*—Stefanos Karmis
(74) *Attorney, Agent, or Firm*—David E. Boundy

(57) ABSTRACT

Futures contracts on options contracts are provided in which the duty to purchase the right to purchase a commodity or security may be agreed upon by two or more parties. The futures contract segment of the exchange device is the duty to purchase the underlying options contract at a specific time. The options contract segment of the exchange device is the right to buy an underlying security or commodity. Margin schemes may be included in either segment of the exchange device or the exchange device as a whole.

20 Claims, 5 Drawing Sheets

```
                                    ┌─ 410
    ┌─────────────────────────────────┐
    │  PROVIDING AN OPTIONS CONTRACT  │
    └─────────────────────────────────┘
                                    ╲ 411
                    ▼
    ┌─────────────────────────────────────────┐
    │ CREATING A FUTURES CONTRACT BASED ON THE│
    │      PROVIDED OPTIONS CONTRACT          │
    └─────────────────────────────────────────┘
                                    ╲ 412
                    ▼
    ┌─────────────────────────────────┐
    │ TRADING THE CREATED FUTURES CONTRACT │
    └─────────────────────────────────┘
                                    ╲ 413
```

FIG. 4

| Symbol | Open | Hi/Low | Last | Settle | Change | Open Int |
|---|---|---|---|---|---|---|
| CBNV | 15.05 | 15/14 | 15.00 | 15.00 | 0.00 | 89 |
| CBSV | 13.35 | 15/12 | 13.00 | 13.00 | 0.00 | 60 |
| CBFR | 16.65 | 15/10 | 16.00 | 16.00 | 0.00 | 40 |
| CBGOL | 19.95 | 25/10 | 19.00 | 19.00 | 0.00 | 20 |
| 510 | 520 | 530 | 540 | 550 | 560 | 570 |

FIG. 5

FUTURES CONTRACT ON OPTIONS CONTRACTS EXCHANGE DEVICE

CROSS REFERENCE TO RELATED APPLICATION

This application claims priority from U.S. Provisional Application No. 60/344,258 filed on Dec. 27, 2001.

BACKGROUND OF THE INVENTION

Certain options contracts tend to be restricted at least in part because of the requirements for options contracts obtained as a means of employment compensation. For example, during the "dot-coin boom" when start-up initial public offerings (IPO's) were widespread, options contracts were often used as a primary source of compensation. Such compensatory options contracts were given to employees by his or her employing company. The options contracts gave the employee the right to purchase up to a specific number of the employing company's stock at a certain price or strike price. Companies using options as a compensation device were able to decrease cash out-flow while increasing an employee's desire to see the company succeed. If the company succeeded, the compensatory options contracts would increase in value and the employee would incur relative profits when he or she exercised the option contracts.

However, the exercising of compensatory options contracts usually included limitations not found in basic options contracts. These limitations were included in order to meet specific goals of the employing company. Such goals included stock price stabilization and capital preservation. One common limitation was a time limitation that prohibited employees from exercising an options contract until a certain amount of time had passed. On the other hand, advantages over basic options contracts were present in compensatory options contracts. One common example was the elimination of an expiration date or the increase in time that the compensatory option contract could be exercised.

Future contracts are well known in the art and are recognized as the duty for one party to purchase or sell an underlying commodity to another party at a specific date or delivery date. Options contracts are also well known in the art and are recognized as the right of a party to purchase or sell an underlying security at a specific date for a specific price.

It would be desirable to improve market liquidity and introduce a novel securities exchange mechanism that would allow for alternative investment hedging techniques and speculation by providing systems and methods for providing futures contracts on options contracts.

SUMMARY OF THE INVENTION

The present invention relates to systems and methods for providing a novel securities exchange mechanism that would allow for alternative investment hedging techniques and speculation. This invention also relates to improving the liquidity and distribution network for options contracts. Particularly, it is an object of this invention to provide futures contracts on options contracts, in which the duty to purchase the right to purchase a commodity or security may be agreed upon by two or more parties.

The futures contract segment of the exchange device is the duty to purchase the underlying options contract. Generally, a specific delivery date or delivery interval will be included in the futures contract and this is the date at which the exchange will occur.

Pricing of the futures contract may depend on a variety of variables including the current price of the options contract and the amount of time until the delivery date is reached. Other pricing mechanisms may be used such as a Black-Scholes derivative or a pricing scheme based on speculating future value. However, in exchanges where free markets are formed, the price of the futures contract will reflect supply and demand in which buyers and sellers determine the exchange price.

The options contract segment of the exchange device is the right to buy an underlying security or commodity. Generally, this will include a specific price and a particular interval in which the option may be exercised. Additional limitations may be imposed in either segment of the exchange device or the exchange device as a whole.

Margin schemes may be included in either segment of the exchange device or the exchange device as a whole. One margin scheme may be based on an algorithm utilizing the attributes of both a futures contract and an options contract. Other margin schemes may, for example, be the basis of a percentage of a particular price or incorporate initial and maintenance margin thresholds.

One area where futures on options contracts may find acceptance is with compensatory option contracts. Particularly, futures on options contracts may provide an employee with the opportunity to realize a sale price on compensatory options before that employee is able to exercise the option due to time restrictions imposed by the employer. This invention would have been very useful during the "dot-com crash", in which stock prices of start-ups went into a free-fall. If future contracts on options contracts were available during the "dot-com crash", employees may have been able to preserve profits the economic result of the phenomena may have been substantially different.

Using the "dot-com crash" scenario as an example to illustrate the invention, a party obtaining a futures contract on an options contract may find many benefits not found in other devices.

Moreover if a party was allowed to sell a futures contract on compensatory options, he may have received some value from these option before these options became valueless. Furthermore, other parties may be given an opportunity to participate in compensatory options programs without having to actually be employed by the company that is providing the options. Preferably this is permitted by the company issuing the options.

The futures on options exchange device may offer new and unique methods for hedging and investment speculation. Additionally, futures on options contracts may provide an alternative to long-term option contracts or "leaps".

Furthermore, some compensatory option contracts sometimes contain advantages not contained in normal options contracts. Particularly, compensatory options contracts sometimes do not have an expiration date and, therefore, can be exercised at any time. In exchange for this advantage, the employee is required to wait a period of time before he can exercise the options so that the employing company is strengthened and capital is preserved. For this reason, a futures on options contract underwritten by an employee for his or her options may not have an expiration date on those options. As a result of these advantages, new speculative attributes may be present in the present invention which may be attractive as an investment mechanism.

It is therefore an object of the present invention to provide systems and methods for providing a futures contract on options contract exchange device. Generally, this exchange device is an agreement for the duty to purchase the right to purchase a particular security or commodity.

BRIEF DESCRIPTIONS OF THE INVENTION

Further features of the invention, its nature and various advantages will be apparent from the following detailed description of the preferred embodiments, taken in conjunction with the accompanying drawings, in which like reference characters refer to like parts throughout, and in which:

FIG. 4 is a flow chart that is illustrative of a method to provide and deliver a futures contract on an options contract in accordance with the principles of the present invention.

FIG. 5 is an illustration of a chart of data for futures contracts on options contracts in accordance with some embodiments of the present invention.

DETAILED DESCRIPTION OF THE INVENTION

This invention relates to creating systems and methods for providing futures contracts for (or on) options contracts. The following embodiments of the invention relates to restricted options contracts such as compensatory options contracts. Nevertheless, these examples do not limit the invention to this particular subject matter. Rather, the examples are provided for illustration of the invention and not to limit it to a particular commodity, market, or type of option.

Figure 1:
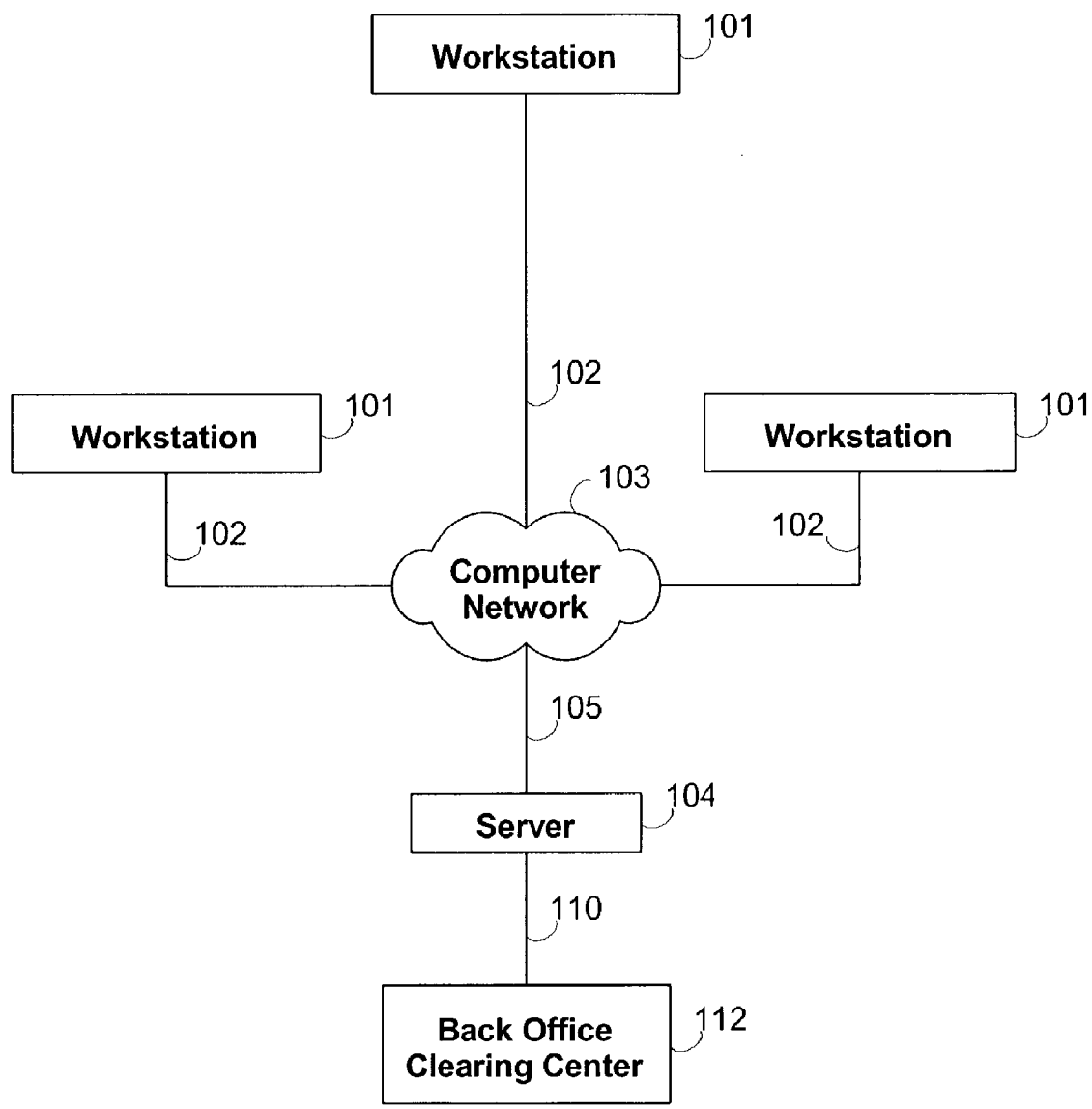
FIG. 1 is an illustration of an electronic implementation of a system to sell a futures contract on an options contract in accordance with some embodiments of the present invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 may be used to process and settle executed trades of futures contracts on options contracts.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with the trades that relate to the present invention, and display trade, benchmark, or spread information to users of system 100.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, etc.

Figure 2:
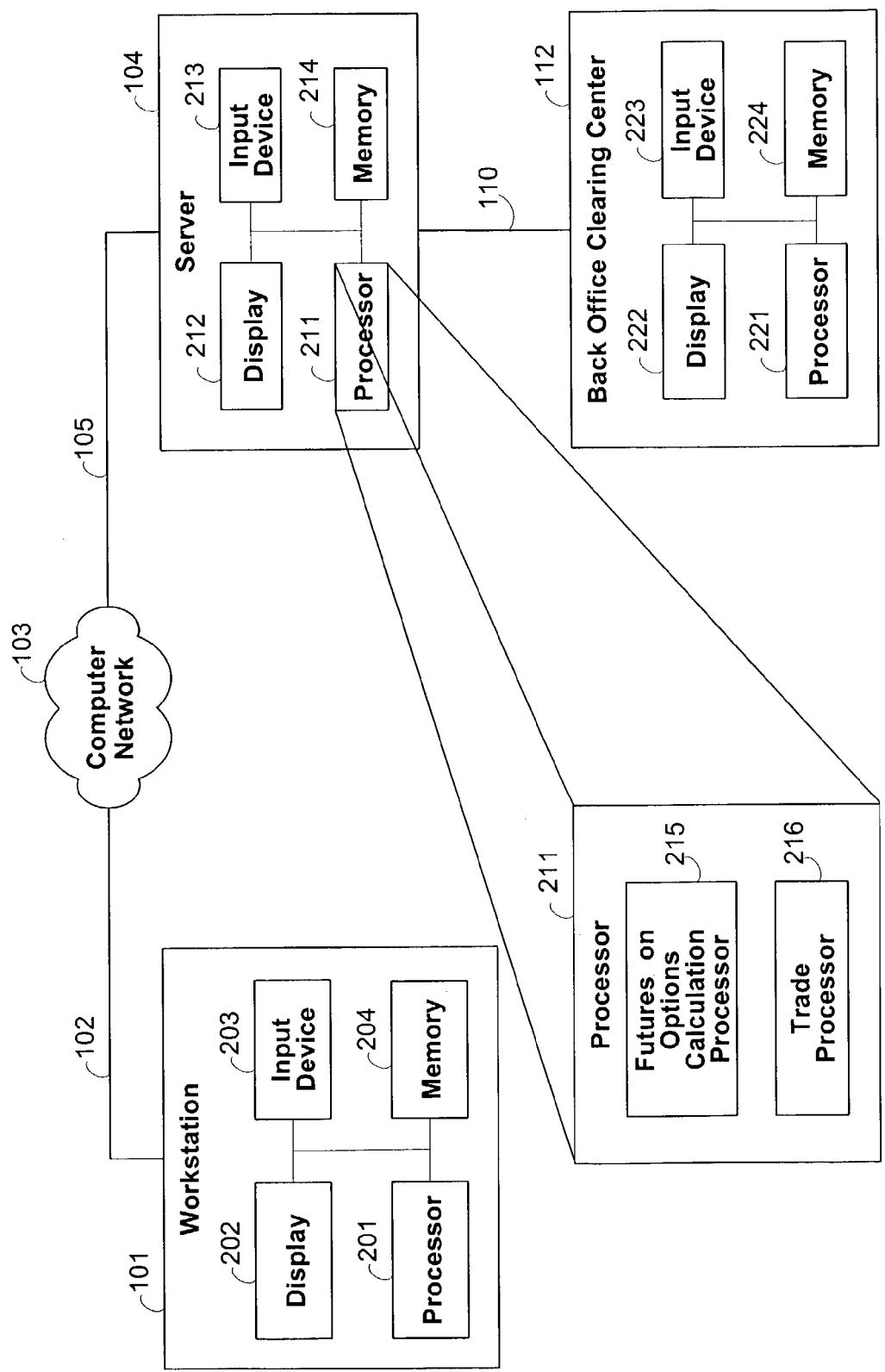
FIG. 2 is an illustration, in greater detail, of an electronic implementation of a system to sell a futures contract on an options contract in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 may use the workstation program to present on display 202 trade information relating to bids, offers, executed trades, and options information to a user of workstation 101. Furthermore, input device 203 may be used by the user to enter such bids and offers, modify them, and to enter into trades involving the futures contracts on options contracts.

Server 104 may include processor 211, display 212, input device 213, and memory 214, which may be interconnected. In a preferred embodiment, memory 214 contains a storage device for storing trade information relating to the trades. The storage device further contains a server program for controlling processor 211. Processor 211 uses the server program to transact the purchase and sale of the futures contracts on options contracts.

The server program operative on processor 211 may be made up of a plurality of individual software modules. These modules may all be present on the one server as in this example or spread amongst multiple systems. These modules are programmed in such a way as to work collectively to implement the full functionality of server 104. Some of the software modules implement the basic functionality of server 104—i.e., the operating system modules. Other modules may implement the systems and methods of the present inventions—i.e. an options analysis module, a futures contract creation module, and a futures contract trading modules. Still other software modules may implement the configuration of server 104. Persons skilled in the art will recognize that the use of software modules to describe different parts of the server program is one way of breaking down the program design for easier description and implementation. The systems and methods of the present invention may be implemented without using the modules as described, they are merely representative of one potential embodiment of the server program.

Processor 211 may include futures on options calculation processor 215 that may be implemented to determine the benchmark values based on market conditions or other criteria that may relate to the items. Processor 211 may include trade processor 216 that executes and processes trades.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to clear executed trades. Clearing executed trades may preferably include exchanging currency for a future commitment to purchase or sell an option.

Figure 3:
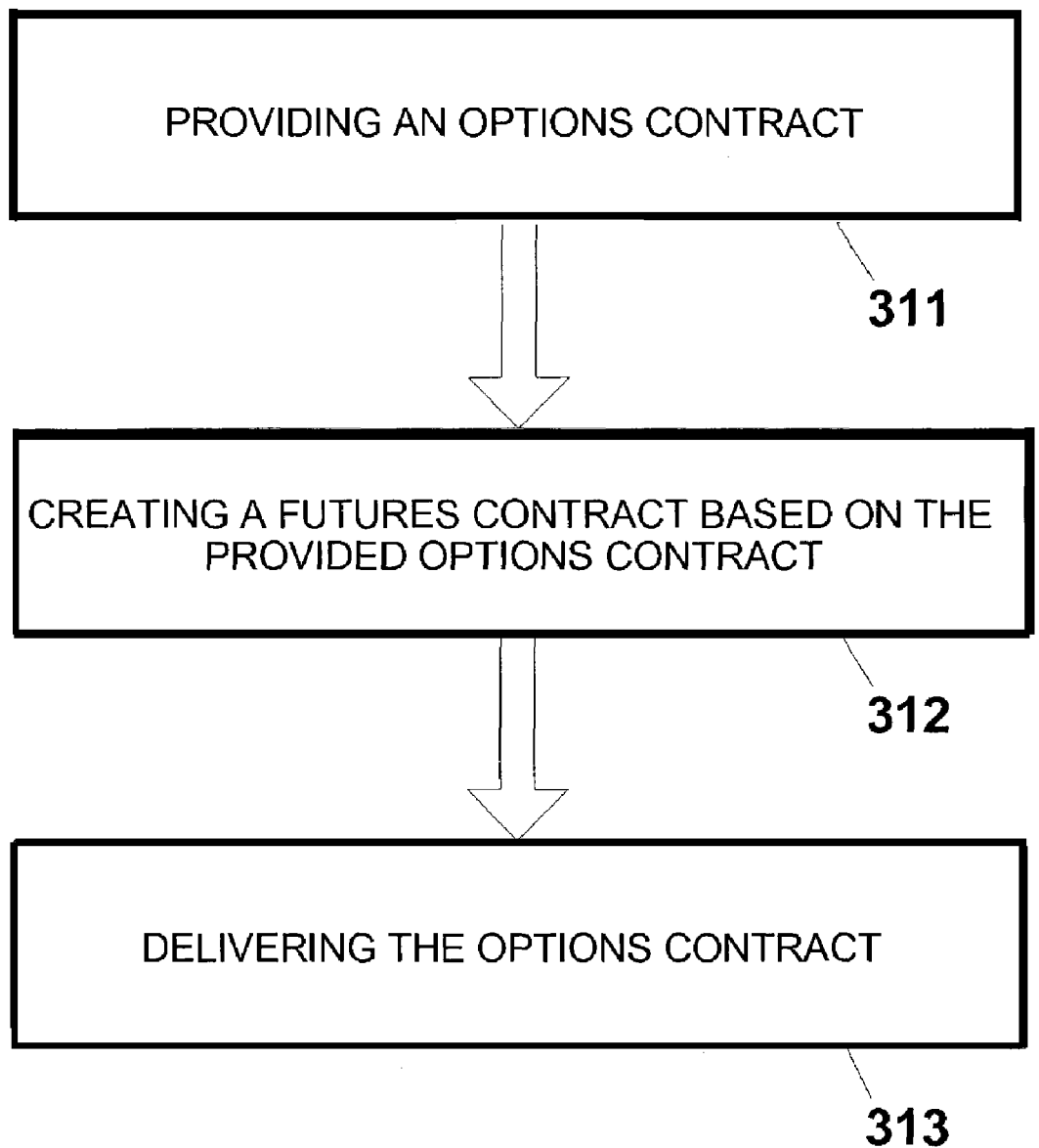
FIG. 3 is a flow chart that is illustrative of a method to provide and trade a futures contract on an options contract in accordance with the principles of the present invention.

FIG. 3 is an illustrative flow chart 310, in which one embodiment of a method for providing and delivering a futures contract on an options contract is depicted. Included in flow chart 310 are three functions that are depicted as steps 311, 312, and 313.

The first step in flow chart 310 is step 311, in which a restricted options contract is provided. One example of a restricted options contract is a compensatory options contract supplied by an employer to an employee. The underlying security for such a restricted options contract may be the common stock for the employing company. Other types of underlying securities for a compensatory option may include, for example, preferred stock, convertible bonds, and corporate bonds.

Generally, the provided options contract is the right to purchase or sell the underlying security at a specific price. For example, suppose the price of a common stock of Company A is $10.00. If Company A gives an employee 100 common stock options at a strike price of $10.00 as a compensatory device then Company A has given the employees the right to buy 100 of Company A's common stock at a price of $10.00. When an employee decides to purchase a common stock through a stock option, that employee is said to have exercised his option or right to buy the underlying security.

Typically, restrictions are imposed on a compensatory stock option. One such restriction is a waiting period, during which the stock options may not be exercised. For example, Company A may require that its employees do not exercise stock options given to them by Company A for at least a year. If at the end of this year Company A's common stock price is at $25.00 and the employee exercises all 100 of the stock options than that employee buys the stock at $10.00. In such a situation, the employee will have made an unrealized profit of $15.00 per share.

An options contract may be used as a device to exchange a specific number of stock options. For example, a single options contract may be used to exchange 100 stock options. Persons skilled in the art, however, will appreciate that an options contract may be used to also exchange a single stock option.

The next step in FIG. 3 is step 312, in which a futures contract based on the provided options contract is created. As stated before, a futures contract is the duty to purchase or sell an underlying security or commodity at a certain date. In a preferred embodiment of the invention, the trading price of the underlying security may be determined when the futures contract is created. Persons skilled in the art will appreciate, however, that other pricing mechanisms such as speculative pricing mechanisms may be agreed upon by the party or parties creating the future contract.

In accordance with the present invention, a futures contract on an options contract is the duty on behalf of the purchaser of the futures contract to purchase an option contract of 100 stock options or other suitable amount from the seller of the futures contract. In accordance with the above examples, suppose the stock price of Company A increases to $25.00 within the first 6 months that the employee has the options contract. Accordingly, the employee may use his 100 stock options as an underlying security to a futures contract. The time of delivery of such a futures contract may be, for example, the time at which the employee gains control of his or her stock options. The price of the futures contract may be $16000 or $16.00 per underlying share where $15000 (e.g., $15.00 per share) is the unrealized profit of the options contract if the current stock price is $25.00 a share. The additional $1000 (e.g. $1.00 per share) may include underwriting the futures contract, and the price of speculation incorporated into the options contract (since options contracts have their own expiration date). As a result, a futures on options contract may allow an employee who owns a restricted options contract to realize profits (e.g., lock in a price) before the waiting period has been exhausted. Moreover, other parties may be given an opportunity to participate in compensatory options programs without having to actually be employed by the company that was providing the options. Preferably this is permitted by the company issuing the options.

The last step in flow chart 310 is step 313, in which the restricted options contract is delivered on the delivery date specified in the futures contract. If the price of Company A common stock decreases significantly, the employee will have realized gains reflective of the futures contract price and will deliver the 100 stock options to the purchaser of the futures contract. The purchaser may choose to exercise the option at the expiration of the futures contract. Persons skilled in the art will appreciate that the purchaser of the futures contract still obtains the underlying stock options even if the value of these stock options decrease. As a result, the purchaser still has the right to buy a specific number of stock at a specific price. Often, compensatory stock options will have either a long-term or no expiration (e.g., exercise) date. Therefore, a long-term speculative value in the options contract may still be present even though the short-term speculative value in the futures contract may have been lost.

FIG. 4 is an illustrative flow chart 410, in which a method for providing and trading a futures contract on an options contract is depicted. Included in flow chart 410 are three functions that are depicted as steps 411, 412, and 413. Persons skilled in the art will appreciate that steps 411 and 412 are the same as respective steps 311 and 312 from FIG. 3.

Step 413 of FIG. 4 may be realized after the restricted options contract has been provided and the futures contract based on this restricted options contract has been established. Particularly, step 413 allows for the trading of a futures contract on an options contract before the delivery date of the futures contract. Persons skilled in the art will appreciate that the trading of a futures on options contract may be embodied through a variety of exchanges, systems, or the equivalent.

FIG. 5 shows an example of a futures screen for the trading options contracts. After selecting a particular options contract or group of options contracts, this screen displays relevant market information. The information on the screen may typically include the symbol of the pertinent options contract 510, the opening price for the options contract 520, the highest and lowest value the options contract traded at within a specified period 530, the price of the last options contract traded 540, the settlement price 550—i.e., the current price of the options contract, the last change in price 560, and the open interest 570—i.e., the total number of options contracts traded that have not yet been liquidated.

One embodiment of the invention may also include a method and system for dealing with margin requirements in futures contracts on options contracts. Margin requirements, and credit checks seek to ensure parties to futures transactions that respective counterparties will meet the delivery obligations of the futures contract. With respect to compensatory options, some mechanism should preferably be used to ensure that the employee, or some other suitable party, provides the compensatory option at a future date.

For example, when an employee leaves before the term required for the compensatory options to vest, he will not be able to satisfy the futures contract because his compensatory options are nullified by his failure to stay at the company for the required term. In one embodiment, the compensatory options may revert to the company and be used by the company to deliver the options to the purchaser of the futures contract. In order to induce the company to perform such a service, any funds received from the sale of the futures contract on the compensatory options should preferably be held in escrow by the company until the employee satisfies the conditions for vesting of the compensatory options.

One difficulty that may arise with respect to such a method or system is the required conversion of the compensatory options to options that may be dispensed to non-employees by the company. This difficulty is preferably dealt with according to the invention during the issuance of the options by the company issuing the options as follows. In one suitable embodiment, the company may write the compensatory options in a suitable way. One such suitable way may be to write the compensatory option such that it is convertible to an option of the company or by issuing new options to satisfy the purchaser of the futures contract at the delivery date of the contract.

In any case, where the company is left to deliver on the outstanding futures contracts, the company should preferably have retained, as a result of the original deed on the futures contract, the proceeds of the sale. Thus, any employee who undertook to sell his options may be required to have the proceeds of the sale retained in an escrow account, preferably with the company, until he delivers on the futures contract. Such a method preferably encourages the employee to stay with the company because of the outstanding tangible benefit which he stands to gain by remaining with the company. In one preferable embodiment of this invention, a software module to process the data on the trade of the futures contracts may also be used to account for the responsible party for the delivery of the options contract, as well as to account for the appropriate recipient of the proceeds from the sale of the futures contract.

Accordingly, systems and methods for providing futures contracts on options contracts are provided. It will be understood that the foregoing is merely illustrative of the principles of the invention and the various modifications can be made by those skilled in the art without departing from the scope and spirit of the invention, which is limited only by the claims that follow.

What is claimed is:

1. A method of trading a futures contract, comprising the steps of:
   at a computer of an electronic trading system designed to trade futures on compensatory options, receiving from a first party an order to trade a futures contract on a compensatory option contract, the compensatory option contract providing a fight to purchase or sell a financial instrument of an issuer that issued the compensatory option to the initial issuee of the compensatory option as compensation for employment by or services to the issuer, the compensatory option providing a right to purchase or sell the instrument at a specified option price, the futures contract creating a duty on the purchaser to purchase or sell the compensatory option contract at a delivery date;
   receiving at a computer of the electronic trading system a counter order for the one futures contract from a counter party; and
   as a result of matching of the order and counter order, issuing transfer instructions to transfer the futures contract on the compensatory option contract between the first party and the counter party.

2. The method of claim 1, further comprising the step of:
   in the electronic trading system, maintaining and executing data instructing delivery of the compensatory option contract on the delivery date.

3. The method of claim 1, wherein the compensatory option contract is a restricted employee option contract.

4. The method of claim 3:
   wherein the restricted employee option contract comprises at least one vesting condition;
   the method further comprising holding, in an escrow account, at least a portion of proceeds from the transfer of the futures contract until the at least one condition for vesting is satisfied.

5. The method of claim 1, wherein
   the compensatory option contract is a convertible employee option.

6. The method of claim 1:
   wherein the compensatory option contract is an employee option;
   the method further comprising issuing at the delivery date a new compensatory option to satisfy a purchaser of the futures contract.

7. The method of claim 1, wherein:
   the futures contract is transferred subject to one margin scheme based on both the future and the compensatory option contract.

8. The method of claim 1, wherein:
   the compensatory option contract is transferred subject to a first margin scheme for the compensatory option contract; and
   the futures contract is transferred subject to a second margin scheme for the futures contract.

9. The method of claim 1, wherein:
   the futures contract order covers a futures on compensatory options contracts with a plurality of vesting dates.

10. The method of claim 1, wherein:
    the financial instrument is stock of the issuer.

11. The method of claim 1, wherein:
    the financial instrument is a bond of the issuer.

12. The method of claim 1, wherein:
    the financial instrument is a convertible bond of the issuer.

13. A system for trading a futures contract, comprising:
    a processor; and
    a memory, the memory having stored therein at least one software module that when executed is operable to cause the processor to:
      receive from a first party an order to trade a futures contract on a compensatory option contract, the compensatory option contract providing a fight to purchase or sell a financial instrument of an issuer that issued the compensatory option to the initial issuee of the compensatory option as compensation for employment by or services to the issuer, the compensatory option providing a fight to purchase or sell the instrument at a specified option price, and the futures contract creating a duty on the purchaser to purchase or sell the compensatory option contract at a delivery date;
      receive a counter order for the futures contract from a counter party; and
      as a result of matching of the order and counter order, issue instructions to transfer the futures contract on the compensatory option contract between the first party and the counter party.

14. The system of claim 13, the method further comprising the step of:
    in the electronic trading system, maintaining and executing data instructing delivery of the compensatory option contract on the delivery date.

15. The system of claim 13, wherein:
the compensatory option contract is a restricted employee option contract.

16. The system of claim 15:
wherein the restricted employee compensatory option contract comprises at least one vesting condition;
the method further comprising holding, in an escrow account, at least a portion of proceeds from the transfer of the futures contract until the at least one condition for vesting is satisfied.

17. The system of claim 13, wherein:
the compensatory option contract is a convertible employee compensatory option.

18. The system of claim 13:
wherein the compensatory option contract is an employee compensatory option;
the method further comprising issuing at the delivery date a new compensatory option to satisfy a purchaser of the futures contract.

19. The system of claim 13, wherein:
the futures contract is transferred subject to one margin scheme based on both the future and the compensatory option contract.

20. The system of claim 13, wherein:
the compensatory option contract is transferred subject to a first margin scheme for the compensatory option contract; and
the futures contract is transferred subject to a second margin scheme for the futures contract.

* * * * *

UNITED STATES PATENT AND TRADEMARK OFFICE
CERTIFICATE OF CORRECTION

PATENT NO. : 7,707,096 B2  Page 1 of 1
APPLICATION NO. : 10/329809
DATED : April 27, 2010
INVENTOR(S) : Philip Ginsberg et al.

It is certified that error appears in the above-identified patent and that said Letters Patent is hereby corrected as shown below:

Column 1, Line 15, change "dot-coin boom" to "dot-com boom".

Column 7, Line 48, change "fight" to "right".

Column 8, Line 46, change "fight" to "right".

Column 8, Line 51, change "fight" to "right".

Signed and Sealed this

Twenty-seventh Day of July, 2010

David J. Kappos
*Director of the United States Patent and Trademark Office*